March 2, 1948. A. L. SMITH 2,437,134
ELECTRODE ASSEMBLY FOR MOISTURE METERS
Filed Dec. 8, 1943
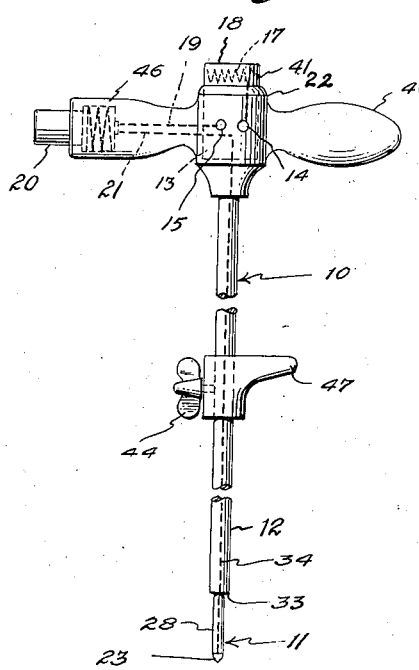
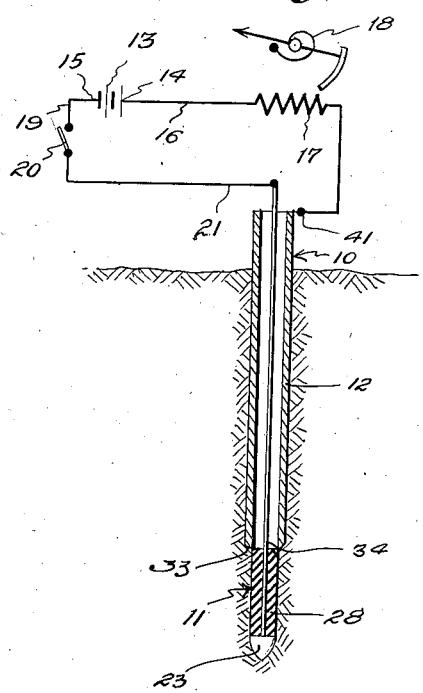
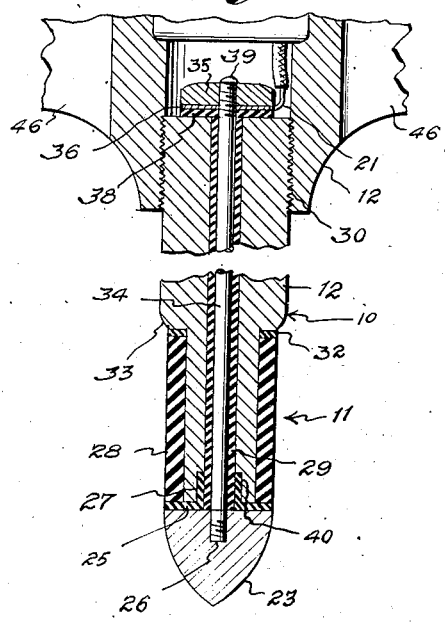
Inventor
August L. Smith
By Henry C. Parker
Attorney Patented Mar. 2, 1948

2,437,134

UNITED STATES PATENT OFFICE 2,437,134

ELECTRODE ASSEMBLY FOR MOISTURE METERS

August L. Smith, Harrison, N. Y.

Application December 8, 1943, Serial No. 513,451

1 Claim. (Cl. 175—183)

This invention relates to meters for measuring soil moisture; and it comprises a meter adapted to determine the relative moisture content of soils, said meter comprising in combination a composite shaft having a lower detecting end, adapted to be inserted into the ground, and an enlarged upper metering head mounted on the upper end of said shaft and enclosing an electric meter, a source of current and a measuring circuit; the detecting end of said shaft comprising a tapered electrode mounted on the end thereof, an electric insulator mounted just above said electrode and having an outer diameter corresponding to the maximum diameter of said electrode, a metal tube forming the upper end of said shaft having an outer diameter just above said insulator which is advantageously slightly greater than the outer diameter of said insulator, the surface of said metal tube tapering and merging into the surface of said insulator at the joint therebetween, thereby forming a tapered shoulder serving as a second electrode spaced from said first electrode by said insulator, and means for connecting said electrodes into said measuring circuit; all as more fully hereinafter set forth and as claimed.

It is, of course, well known that the moisture content of a soil is a very important factor in the welfare and growth of agricultural and horticultural crops. Extremes of both moisture and dryness are harmful to crops and are not always apparent from the condition of the soil on the surface of the ground. One common method of testing the moisture content of the soil is to squeeze a handful of the topsoil to see if it feels moist. This method is, of course, a mere rule of thumb method which gives no information whatever of the subsoil moisture. But the subsoil moisture is usually more important than the topsoil moisture in determining whether irrigation or watering is required and, in the case of trees and some crops, the topsoil moisture is relatively unimportant. In spite of an important demand for measuring devices for determining soil moisture, to date no simple device has been suggested which is practical and easily handled.

I have developed an electrical device for measuring soil moisture which takes advantage of the fact that a dry soil is a very poor conductor of electricity while wet soil is an excellent conductor. I have found that, if a shaft bearing two spaced electrodes which are insulated from each other, is thrust into the ground, and if these electrodes are connected in an electric measuring circuit, the resistance of the soil to the passage of the electric current can be used as a measure of the soil moisture at the point between said electrodes. By this means the moisture content of the soil can be measured with sufficient accuracy for any horticultural practice and to a depth of several feet.

I have found that the most convenient way of mounting the electrodes of such a device is to provide one at the end of a composite shaft, the electrode being tapered to a point for ease in inserting it into the ground. Just above this electrode I provide an insulator, which has an outer diameter corresponding to the top of the electrode and which may be of rubber or molded plastic. Above this a metal tube is provided which preferably has an outer diameter slightly greater than that of the insulator. The outer surface of this metal tube tapers and merges smoothly with the surface of the insulator at the joint therebetween, thus forming a shoulder which constitutes the second electrode. The entire surface of this detecting end of the shaft is streamlined for ease of insertion and removal from the ground as well as for ease of cleaning. The upper end of the shaft is provided with a measuring head with handles on either side which are used for forcing the detecting end of the shaft into the ground and for removing it after measurements have been taken. An electric meter, a battery and a measuring circuit are mounted in the measuring head, while a push button is usually mounted at the end of one of the handles, this button being adapted to close the measuring circuit when a reading is to be taken. Insulated leads are provided for connecting the electrodes into the measuring circuit. The entire meter as thus constructed forms a compact and foolproof device which is easily handled and can be operated by even untrained workmen.

I have discovered that fairly accurate measurements can be made when the upper electrode of my meter has an outer diameter corresponding to the diameter of the insulated portion of the meter shaft. But I have found that the accuracy of the measurements can be greatly increased if the upper electrode has a somewhat larger diameter and tapers at its lower end to form a shoulder merging into the surface of the insulator, as described above. This construction provides a more positive contact of the upper electrode with the soil. And I have found it desirable to have the surface area of this electrode at least approximately equal to the area of the lower electrode at the tip of the shaft. When thus constructed the contact pressure between the two electrodes and the ground becomes approximately equal and the moisture readings are more accurate. The contact between the electrodes and the ground can also be improved somewhat if the shaft is pressed downwardly at the time readings are taken.

My invention can be explained in more detail by reference to the accompanying drawings which show, more or less diagrammatically, several modifications of my meter which have been found satisfactory in actual practice. In this showing, Fig. 1 is a front elevation showing my meter as a whole, Fig. 2 is a diagrammatic longitudinal elevation showing the electrodes in the electric circuit, while Fig. 3 is an enlarged partial section through the lower part of the meter, showing how the electrodes and insulator are mounted and how electric connection is made to the lower electrode.

In the various figures like parts are designated by like reference numerals. Referring first to Figs. 1 to 3, the meter consists of a shaft, shown generally at 10, the lower end of which constitutes the detecting end or tip, shown generally at 11. On the upper end of the shaft a measuring head 22 is mounted, having handles 46 on either side. A lower cone-shaped electrode 23 is mounted at the lower end of the shaft. An insulator 28 is mounted directly above the electrode, this insulator having an outer diameter corresponding to that of the upper end of the electrode. The length of this insulator determines the distance between the electrodes, i. e. the length of the measuring gap.

The upper end of shaft 10 consists of a metal tube 12 which preferably has a diameter slightly greater than that of the insulator and the lower electrode and is threaded into the measuring head as at 30. This metal tube is tapered where it joins the insulator to form a shoulder 33 which constitutes the upper electrode. Of course the entire surface of this metal tube, which is in the ground and above the insulator, conducts some of the electric current and thus can be considered part of the electrode but, since the bulk of the current passes through the shoulder, it is convenient to call this shoulder the electrode.

In the construction shown in Fig. 3 the metal tube 12 extends downwardly inside the insulator 28 for strengthening purposes. When constructed in this fashion the insulator may be of soft rubber vulcanized or cemented on the tube, for example, or it can be of plastic and molded on the tube. The electrode 23 is secured to the end of the shaft by means of a metal rod 34 which also serves as an electrical conductor, this rod being threaded into the electrode, as at 26. The rod is also threaded at its upper end 39 to receive a nut 35 which, when tightened, serves to force the electrode against an insulating bushing 25 which in turn presses against the end of the tube 12. The lower end of the tube is counterbored at 40 to receive an upstanding flange 27 of the bushing. This construction prevents any moisture from entering the joint between the bottom of the tube 12 and the electrode, which moisture would tend to short circuit the electrodes. The insulating material 29, which may be an insulating varnish or rubber, for example, surrounding the rod 34, also prevents moisture from short circuiting the electrodes, as well as preventing contact between the rod and the tube. An insulating washer 38 is provided beneath the nut 35 and the tube 12, while electrical connection to the rod 34 and hence to the electrode 23 is provided by the metal washer 36 to which lead 21 is soldered. If the insulator 28 is of some hard material, such as hard rubber or porcelain, it is advisable to provide an insulating washer 32 at the joint between shoulder 33 and the insulator.

The electrical connections for my meter are shown best in Fig. 2. It will be noted that a dry cell 13 is provided, the positive terminal 14 of which is attached to a connector 16 leading to the coil 17 of a milliammeter 18. The other terminal of the milliammeter is grounded at 41, furnishing electrical connection to the metal tube 12. The rod 34 is connected at its upper end to the negative pole 15 of the battery through the push button switch 19, 20. As shown in Fig. 1, this switch is conveniently mounted in an end of one of the handles 46, while the meter 18 is mounted at the top of the measuring head 12. In this figure a foot bracket 47 is also shown which may be used to force the shaft 10 into the ground, if desired. This bracket is adjustable by means of wing nut 44 and can be used as a stop to be certain that the electrode is always thrust the same distance into the soil, if that is desired.

I have found it convenient to make the shaft of my instrument about 36 inches long with an outer diameter for the tube 12 of about 3/4 inch. The insulator 28 and the top of electrode 23 can then have a diameter of 5/8 inch, the measuring gap having a length of about 3 1/2 inches. If a battery having a voltage of 22 1/2 volts and a meter reading up to 10 milliammeters are used, the maximum reading of 10 millimeters will then occur when the ground is substantially saturated with moisture. A zero reading will then indicate a degree of aridity which is close to the wilting point of transplanted nursery stock. By keeping the soil moisture between 5 and 6 milliammeters on this scale, conditions favorable to the growth of most plants will be maintained. A reading of 9 to 10 milliammeters over a period of several days indicates a dangerous condition which may result in the "drowning" of nursery stock. Prompt drainage is necessary when such a condition arises.

Since the current which flows across the measuring gap is directly proportional to the moisture content of the soil, it is possible to calibrate the scale in terms of moisture content, if desired. For example, if a reading of 10 milliammeters is obtained when the soil is saturated with water, this point can be marked 100 per cent saturation. The 5 milliammeter mark will then correspond to 50 per cent saturation and so on.

While I have described what I consider to be the more advantageous modifications of my moisture meter, it is evident that many modifications can be made in the specific structures which have been described without departing from the purview of this invention. Thus the shaft of my meter may be varied in both length and shape; it may be circular, elliptical or square in cross section, for example, or it may taper continuously from the top to the bottom. The measuring circuit may be provided with a rheostat so that the meter scale can be calibrated to give a standard reading when the shaft is inserted in a soil which has been saturated with moisture. As the battery runs down, such a rheostat can then be operated to compensate for the lower voltage supplied to the measuring gap. If desired, the meter can be provided with two scales, one for taking readings of a soil which is close to its saturation point and the other for measuring soils which are substantially dry. Or one scale to measure moisture content and another to check the battery, may be provided, if desired. The meter can be used to map the condition of a piece of ground, lines being drawn through points of equal moisture content. Such lines give valuable information with respect to drainage of the ground; they indicate the proper points at which to provide irrigation or watering and they quickly designate points of stagnation or stoppage of drainage. The metal parts of my meter can be made of any suitable metal which has sufficient strength. Steel is satisfactory although, if steel is used, care must be taken to carefully dry the shaft after each series of readings, since any rust changes the readings and also makes the surface difficult to clean. It is important, of course, to remove all soil from the shaft between each reading. I have found that the steel tubes, of the type used for small high-pressure steam conduits, are admirably suited for constructing shaft 12. In the more expensive models stainless steel or Monel metal can be used. The shaft of the meter can, of course, be calibrated to indicate the depth to which the end electrode is inserted. Further modifications which fall within the scope of the following claim will be immediately evident to those skilled in this art.

What I claim is:

An electrode assembly for use in measuring soil moisture which comprises a tubular composite shaft, a pointed metal electrode mounted at the lower end of said shaft, a metal tube extending substantially the length of said shaft insulated from said electrode and having a constricted portion just above said electrode, an insulating sleeve mounted outside said constricted portion having a diameter corresponding to the diameter of said electrode and a surface merging at its lower end into the surface of said electrode, a metal section forming part of said tube just above said insulating sleeve, having a diameter larger than that of said sleeve and said pointed electrode and having a surface which at its lower end tapers and merges into the surface of said sleeve, said tapered portion of said tube serving as a second electrode.

AUGUST L. SMITH.

REFERENCES CITED

The following references are of record in the file of this patent:

UNITED STATES PATENTS

| Number | Name | Date |
| --- | --- | --- |
| 896,904 | Foulke et al. | Aug. 25, 1908 |
| 1,610,563 | McIlvaine | Dec. 14, 1926 |
| 1,910,021 | Legg | May 23, 1933 |
| 1,978,440 | Shepard | Oct. 30, 1934 |
| 2,183,492 | Rabl | Dec. 12, 1939 |
| 2,215,213 | Ellis | Sept. 17, 1940 |
| 2,249,769 | Leonardon | July 22, 1941 |
| 2,328,853 | Sherrard | Sept. 7, 1943 |

FOREIGN PATENTS

| Number | Country | Date |
| --- | --- | --- |
| 345,802 | France | Dec. 17, 1904 |
| 517,212 | Germany | Feb. 2, 1931 |